Patented Mar. 10, 1931

1,796,012

UNITED STATES PATENT OFFICE

WILHELM ECKERT, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

AMINO-NAPHTHALIMIDO-SULPHONIC ACID COMPOUNDS AND PROCESS OF PREPARING SAME

No Drawing. Application filed April 4, 1929, Serial No. 352,606, and in Germany April 12, 1928.

My present invention relates to a process of preparing acid wool dyestuffs and to new products obtainable thereby.

I have found that acid wool dyestuffs of the kind described in my copending U. S. application Ser. No. 313,954 filed October 20, 1928, are obtainable by treating nitronaphthalic acid derivatives of the following general formula:

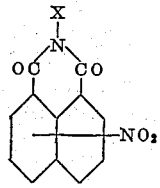

wherein X stands for hydrogen, alkyl, aralkyl or aryl in an aqueous solution with such reducing agents as simultaneously effect the entrance of a sulphonic acid group. Such agents are, for instance hydrosulfite, bisulfite or the like.

It is advantageous to add to the aqueous solution a water-soluble organic solvent, for instance, alcohol. The reaction, generally, is carried out at boiling temperature, but it is also sufficient to heat the solution to a somewhat lower temperature.

It is also possible to use as parent materials such nitronaphthalic acid derivatives as contain a sulphonic acid group.

In this case the introduction of a further sulphonic acid group is unnecessary and it is sufficient to reduce the nitro group. As stated before, the products obtainable by my process have been described partly in my copending application Serial No. 313,954. I wish to claim as new compounds in the present application the products of the general formula:

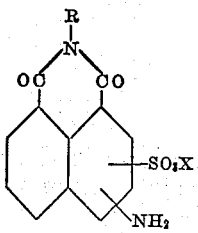

wherein R stands for hydrogen or alkyl and X represents hydrogen or a metal, as for instance an alkali metal atom.

These products dye the animal fiber from an acid bath very even and extremely clear tints.

The nitronaphthalic acid derivatives of the above given formula can be prepared either by oxydizing nitroacenaphthenes or by directly nitrating naphthalic anhydride (cf. Berichte der Deutschen Chemischen Gesellschaft vol. 32, page 3284) and subsequently condensing with ammonia, or a primary aliphatic or aromatic amine.

The following examples illustrate the invention, the parts being by weight unless otherwise stated:

(1) 10 parts of 4-nitro-naphthalic-N-methylimide of the following formula:

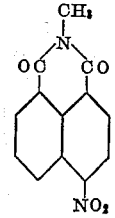

are mixed, while stirring, with 20 parts by volume of alcohol and heated to boiling temperature with a solution of 25 parts of hydrosulfite in 125 parts by volume of water. When the formation of the dyestuff is finished, the residue is thoroughly boiled with water, the filtrates are concentrated to a smaller volume and the dyestuff is salted out. It has in the form of its sodium salt the following formula:

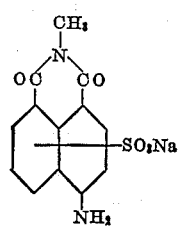

and is a yellow crystalline powder which dissolves in water to a clear yellow solution with a strong greenish fluorescence. It dyes the animal fiber from an acid bath very even clear yellow tints.

There may also be used instead of the 4-nitro-N-naphthalic methylimide the corresponding ethylimide, phenylimide or the like and instead of hydrosulfite a bisulfite solution.

(2) A paste made from 50 parts of 4-nitro-naphthal-imide and 150 parts by volume of alcohol is introduced into a solution of 100 parts of hydrosulfite in 500 parts by volume of water and the whole is subsequently heated to boiling for some hours.

The dyestuff which in the form of its sodium salt has the following formula:

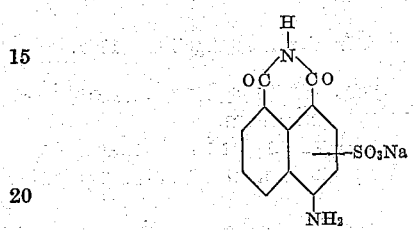

is isolated as indicated in Example 1. It is a yellow water-soluble powder which dyes wool from an acid bath a very clear, intense greenish yellow tint.

(3) 130 parts of 4-nitro-1.8-naphthalic-4'-sulfophenylimide of the formula:

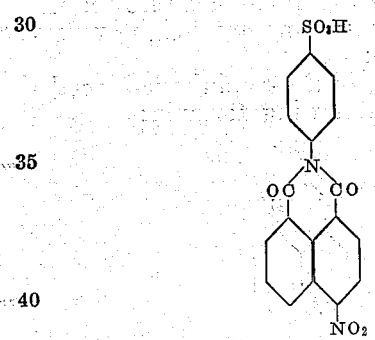

are heated to boiling with 500 parts by volume of an aqueous hydrosulfite solution of about 20% strength. After some hours the solution is filtered and after concentrating the filtrate the dyestuff is obtained by salting it out in the usual manner. It dyes wool from an acid bath a very clear yellow tint.

I claim:

1. The process which comprises boiling a compound of the following general formula:

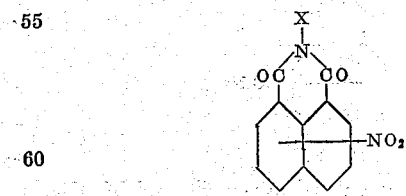

wherein X stands for hydrogen, alkyl, aralkyl or aryl with an aqueous solution of hydrosulfite.

2. The process which comprises boiling a compound of the following general formula:

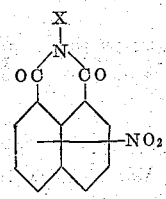

wherein X stands for hydrogen, alkyl, aralkyl or aryl with an aqueous solution of hydrosulfite in the presence of a water-soluble organic diluent.

3. The process which comprises boiling a compound of the following general formula:

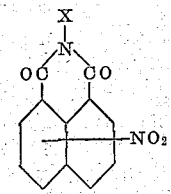

wherein X stands for hydrogen, methyl or a substituted or unsubstituted benzene residue with an aqueous solution of hydrosulfite.

4. The process which comprises boiling a compound of the following general formula:

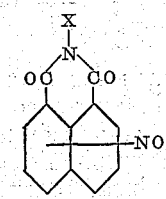

wherein X stands for hydrogen, methyl or a substituted or unsubstituted benzene residue with an aqueous solution of hydrosulfite in the presence of a water-soluble organic diluent.

5. The process which comprises boiling 4-nitro-naphthalic-N-methyl-imide with an aqueous solution of hydrosulfite.

6. The process which comprises boiling 4-nitro-naphthalic-N-methyl-imide with an aqueous solution of hydrosulfite in the presence of a water-soluble organic diluent.

7. As new products the compounds of the following general formula:

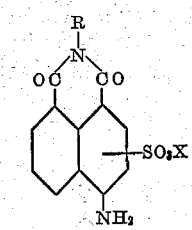

wherein R stands for hydrogen or alkyl and X represents hydrogen or a metal atom dyeing the animal fiber from an acid bath very even and extremely clear tints.

8. As a new product the compound of the following formula:

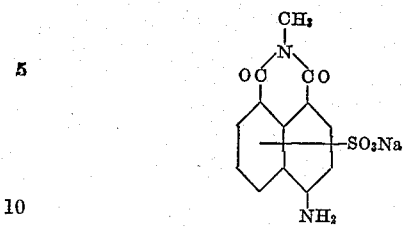

being a yellow crystalline powder dissolving in water to a clear yellow solution with a strong greenish fluorescence and dyeing the animal fiber from an acid bath a clear yellow tint.

9. As new products the compounds of the following general formula:

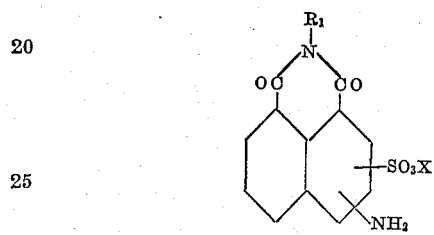

wherein $R_1$ represents hydrogen or alkyl and X stands for hydrogen or a metal, dyeing the animal fiber from an acid bath very even and extremely clear tints.

10. As a new product the compound of the following formula:

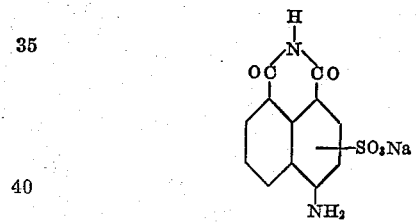

being a yellow water-soluble powder, dyeing animal fiber from an acid bath a clear greenish yellow tint.

In testimony whereof, I affix my signature.

WILHELM ECKERT.